(12) United States Patent
Naganawa

(10) Patent No.: US 11,095,003 B2
(45) Date of Patent: Aug. 17, 2021

(54) ENERGY STORAGE APPARATUS

(71) Applicant: Blue Energy Co., Ltd., Kyoto (JP)

(72) Inventor: Nobuyuki Naganawa, Kyoto (JP)

(73) Assignee: BLUE ENERGY CO., LTD., Kyoto (JP)

( * ) Notice: Subject to any disclaimer, the term of this patent is extended or adjusted under 35 U.S.C. 154(b) by 51 days.

(21) Appl. No.: 16/403,231

(22) Filed: May 3, 2019

(65) Prior Publication Data
US 2019/0348660 A1  Nov. 14, 2019

(30) Foreign Application Priority Data

May 8, 2018   (JP) .............................. JP2018-090000

(51) Int. Cl.
*H01M 50/502* (2021.01)
*H01M 10/48* (2006.01)
*H01M 50/20* (2021.01)

(52) U.S. Cl.
CPC ....... *H01M 50/502* (2021.01); *H01M 10/482* (2013.01); *H01M 50/20* (2021.01)

(58) Field of Classification Search
CPC .... H01M 2/206; H01M 2/1077; H01M 2/202; H01M 2/1016; H01M 10/482; H01M 10/486; H01M 10/425; H01M 10/0525; H01M 50/20; H01M 50/502
See application file for complete search history.

(56) References Cited

U.S. PATENT DOCUMENTS

| | | | |
|---|---|---|---|
| 6,168,470 B1 | 1/2001 | Ikeda et al. | |
| 2016/0072112 A1* | 3/2016 | Smith ................. | H01M 10/482 429/93 |
| 2016/0172650 A1 | 6/2016 | Ichikawa et al. | |

FOREIGN PATENT DOCUMENTS

| | | | |
|---|---|---|---|
| JP | H 01-064850 U | 4/1989 | |
| JP | H 11-120986 A | 4/1999 | |
| JP | 2001-155702 A | 8/2003 | |
| JP | 2003-242950 A | 8/2003 | |
| JP | 2004-319342 A | 11/2004 | |
| JP | 2009-230954 A | 10/2009 | |
| JP | 2011-018473 A | 1/2011 | |
| JP | 2013-109914 A | 6/2013 | |
| JP | 2013109914 * | 6/2013 | ............. H01M 2/10 |
| JP | 2013-185414 A | 9/2013 | |
| JP | 2016-115543 A | 6/2016 | |

OTHER PUBLICATIONS

English translation of JP2013109914.*

* cited by examiner

*Primary Examiner* — Milton I Cano
*Assistant Examiner* — Kiran Akhtar
(74) *Attorney, Agent, or Firm* — McGinn I.P. Law Group, PLLC.

(57) ABSTRACT

Provided is an energy storage apparatus which includes: a plurality of energy storage devices arranged in a first direction; a plurality of bus bars electrically connecting the energy storage devices; and a bundle portion configured by bundling a plurality of electric wires connected to the energy storage device or the bus bar. The bundle portion is configured such that a base portion of the bundle portion is disposed at a position along the energy storage devices. The position is an intermediate position of the plurality of the energy storage devices in the first direction. The bundle portion is configured to change a direction thereof using the base portion as an initiation point.

18 Claims, 7 Drawing Sheets

ENERGY STORAGE APPARATUS

CROSS-REFERENCE TO RELATED APPLICATIONS

This application claims the benefit of Japanese patent application No. 2018-090000 filed on May 8, 2018 which is incorporated by reference.

FIELD

The present invention relates to an energy storage apparatus including a bundle portion configured by bundling electric wires used for the measurement of voltages or the like.

BACKGROUND

Conventionally, there has been known an assembled battery including a cable harness (see JP 2013-109914 A). To be more specific, the assembled battery includes a plurality of voltage detection wires arranged for transmitting voltage signals of predetermined battery cells or voltage signals of the respective battery cells. The plurality of voltage detection wires are collected together and are formed into a cable harness extending in a thickness direction of the battery cell as a bundle in the course of routing the voltage detection wires, and reach a connector disposed on the same side as a positive electrode side terminal which forms a collective terminal portion. On the other hand, the plurality of voltage detection wires are collected together and are formed into a cable harness extending in a thickness direction of the battery cell as a bundle in the course of routing the voltage detection wires, and reach a connector disposed on the same side as a negative electrode side terminal which forms a collective terminal portion. The assembled battery further includes a plurality of temperature detection wires which are disposed for transmitting temperature signals detected from detection terminals connected to predetermined portions of the plurality of battery cells. The plurality of temperature detection wires are collected together and are formed into one cable harness outside a profile of the assembled battery, and are connected to a connector. The respective connectors described above are connected to a control circuit of a battery monitoring device.

In the above-mentioned assembled battery, the lead-out directions of the cable harnesses in the assembled battery are decided and hence, in the case where a plurality of assembled batteries are disposed, and connectors of the respective assembled batteries are connected to one control circuit, there has been a case where the cable harnesses cannot be routed or routing of the cable harnesses becomes difficult.

Accordingly, it is necessary to prepare plural kinds of assembled batteries where lead-out directions of cable harnesses are set corresponding to the arrangement position of a control circuit. That is, it is necessary to prepare the plural kinds of assembled batteries which differ from each other in lead-out direction of the cable harness.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

Accordingly, it is an object of the present invention to provide an energy storage apparatus which can easily change a lead-out direction of a bundle portion of electric wires.

The energy storage apparatus according to an aspect of the present invention includes:

a plurality of energy storage devices arranged in a first direction; a plurality of bus bars electrically connecting (physically directly connecting) the energy storage devices; and a bundle portion configured by bundling a plurality of electric wires which includes an electric wire connected to the energy storage device or the bus bar, wherein the bundle portion is configured such that a base portion of the bundle portion (one end of the bundle portion) is disposed at a position along the energy storage devices, the position being an intermediate position of the plurality of the energy storage devices in the first direction, and the bundle portion is configured to change a direction of the bundle portion using the base portion as an initiation point.

BRIEF DESCRIPTION OF DRAWINGS

The foregoing and other features of the present invention will become apparent from the following description and drawings of an illustrative embodiment of the invention in which.

DESCRIPTION OF EMBODIMENTS

An energy storage apparatus according to an aspect of the present invention includes:

a plurality of energy storage devices arranged in a first direction;

a plurality of bus bars electrically connecting (physically directly connecting) the energy storage devices; and a bundle portion configured by bundling a plurality of electric wires which includes an electric wire connected to the energy storage device or the bus bar, wherein the bundle portion is configured such that a base portion of the bundle portion (one end of the bundle portion) is disposed at a position along the energy storage devices and at an intermediate position in the first direction of the plurality of the energy storage devices, and, at the same time, is configured to change a direction of the bundle portion using the base portion as an initiation point.

With such a configuration, the direction of the bundle portion configured by bundling the plurality of electric wires can be changed using the base portion of the bundle portion as an initiation point and hence, the lead-out direction of the bundle portion from the energy storage apparatus can be easily changed.

In this case, the base portion of the bundle portion may be disposed at a center position in the first direction.

Figure 6:
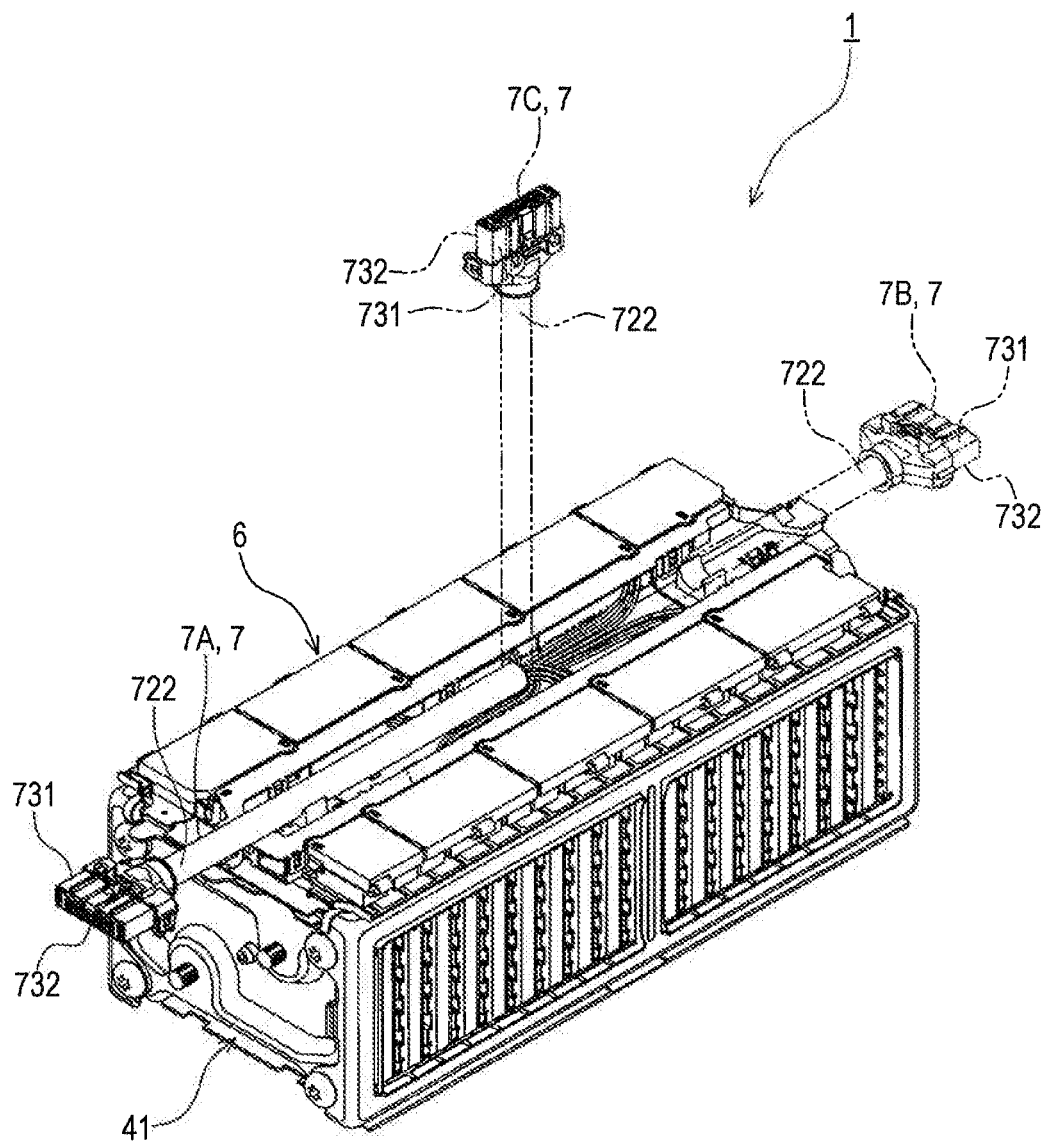
FIG. 6 is a schematic view showing that a lead-out direction of a bundle portion can be changed according to the energy storage apparatus.
Figure 7:
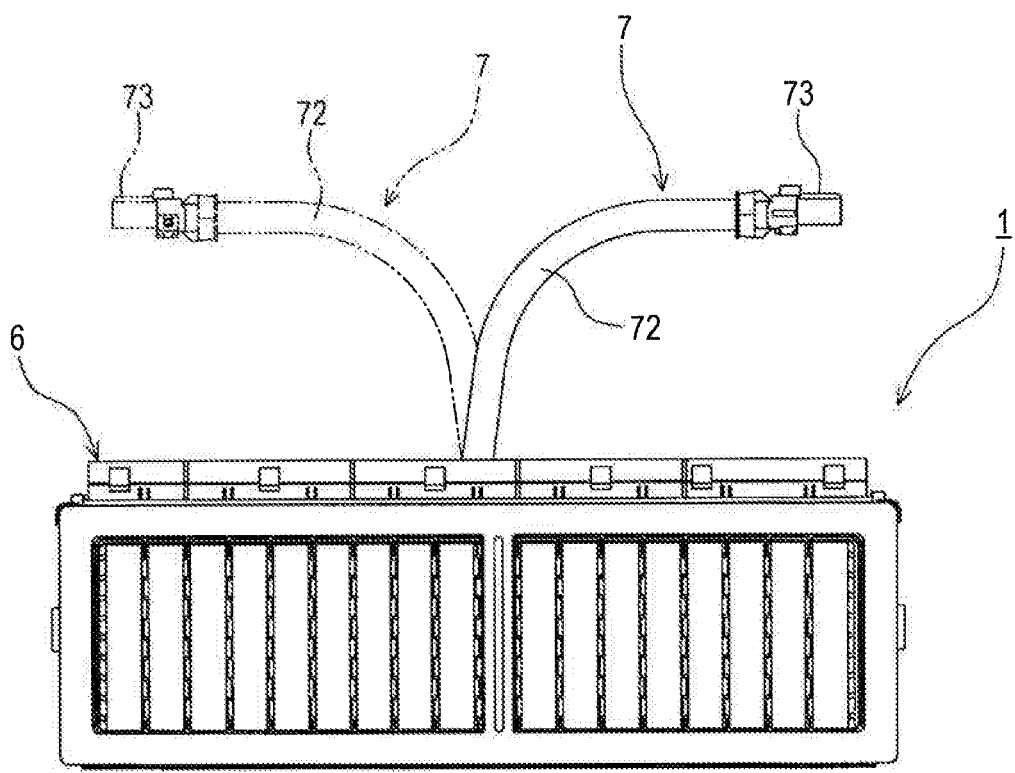
FIG. 7 is a schematic view for describing flexibility of the bundle portion.

With such a configuration, whichever direction the lead-out direction of the bundle portion is changed between the direction toward one side and the direction toward the other side in the first direction, it is possible to make a distance from a first end portion of the energy storage apparatus (the energy storage apparatus excluding the bundle portion) in the predetermined direction to a tip portion of the bundle portion and a distance from a second end portion of the energy storage apparatus in the predetermined direction to the tip portion of the bundle portion equal (for example, see symbols 7A, 7B in FIG. 6).

The energy storage apparatus may include a holding portion which detachably holds the bundle portion in a state where the bundle portion extends along the plurality of energy storage devices in the first direction.

Since the energy storage apparatus includes the holding portion as described above, it is possible to fix the bundle portion when the bundle portion is led out toward one side or the other side in the first direction. Further, the holding portion detachably holds the bundle portion and hence, even after the bundle portion is held by the holding portion, the direction of the bundle portion can be easily changed by removing the bundle portion from the holding portion.

In the energy storage apparatus, the bundle portion may include, at a tip portion thereof, a connector which is flattened in a direction orthogonal to a fitting direction with a counterpart connector, and a longitudinal direction of the flat connector may extend along the first direction in a state where the bundle portion extends along a second direction away from the plurality of energy storage devices.

In the case where it is already determined which one of surfaces out of the surfaces of the flat connector in a lateral direction is directed toward one side in the second direction in the use of the connector, with such a configuration, whichever direction the bundle portion is led out between the direction toward one side or the direction toward the other side in the first direction, by rotating the connector about the bundle portion by a half rotation, the direction of the connector (the front-and-back direction) can be made equal. That is, in the energy storage apparatus where one side surface of the connector in the lateral direction is directed toward one side in the second direction when the bundle portion is led out toward one side in the first direction, to make the front-and-back direction of the connector when the bundle portion is led out toward the other side in the first direction equal to the front-and-back direction of the connector when the bundle portion is led out toward one side in the first direction, it is necessary to twist the connector about the bundle portion (the center line of the bundle portion) by a half rotation (180°). Accordingly, when the bundle portion is used in a state where the bundle portion is lead out toward the other side in the first direction, the electric wires is liable to be damaged due to the twisting. However, with such a configuration, whichever direction the bundle portion is led out between the direction toward one side in the first direction and the direction toward the other side in the first direction, by merely twisting the connector by a quarter rotation (90°), the direction (front-and-back direction) of the connector can be set equal and hence, a damage on the electric wires due to the twisting can be suppressed.

As described above, according to this embodiment, it is possible to provide an energy storage apparatus where the lead-out direction of the bundle portion can be changed.

Hereinafter, one embodiment of the present invention is described with reference to FIG. 1 to FIG. 7. In this embodiment, names of respective constitutional members (respective constitutional elements) are used only for this embodiment, and may differ from names of respective constitutional members (respective constitutional elements) used in BACKGROUND.

Figure 1:
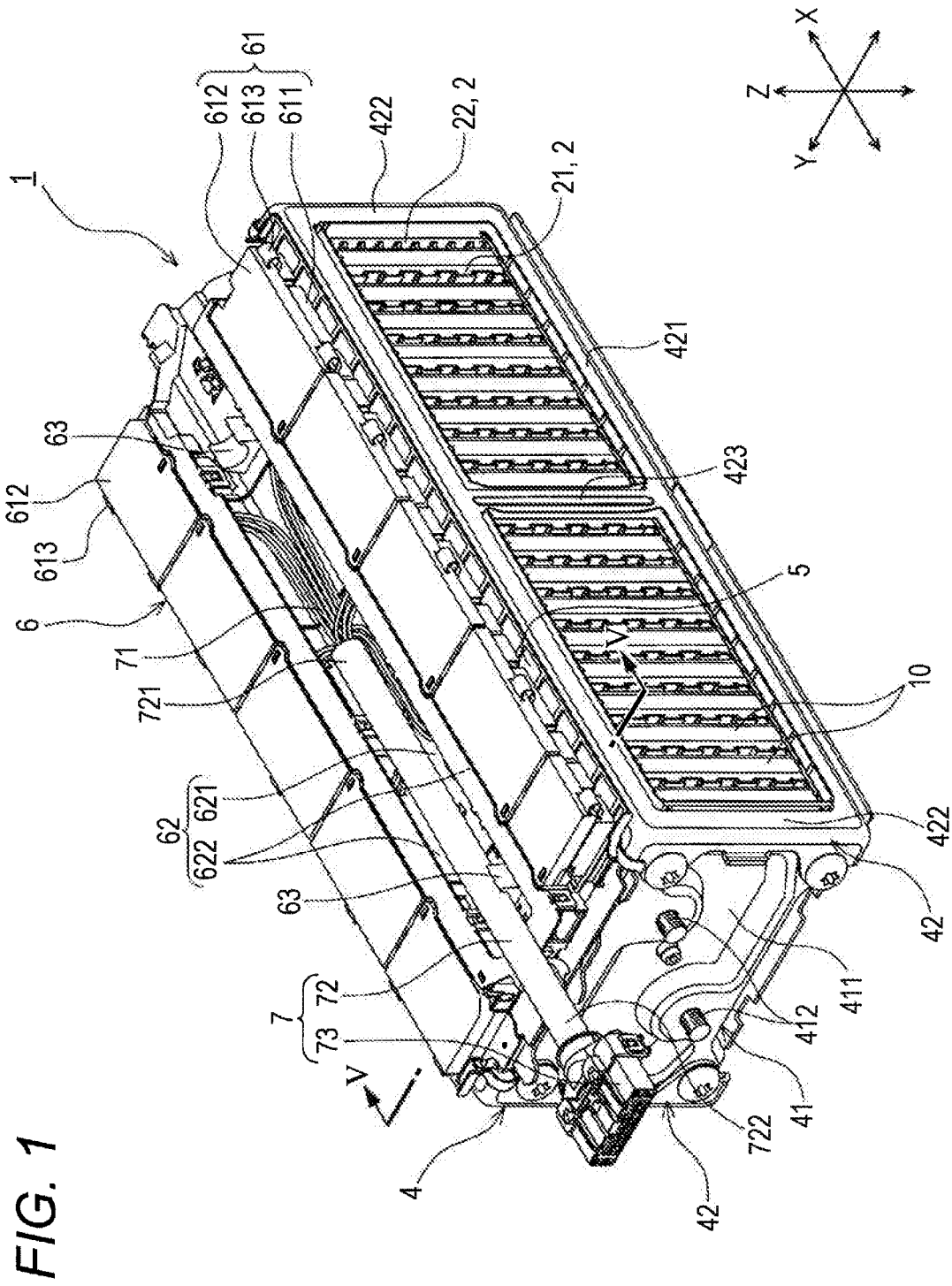
FIG. 1 is a perspective view of an energy storage apparatus according to an embodiment of the present invention.
Figure 2:
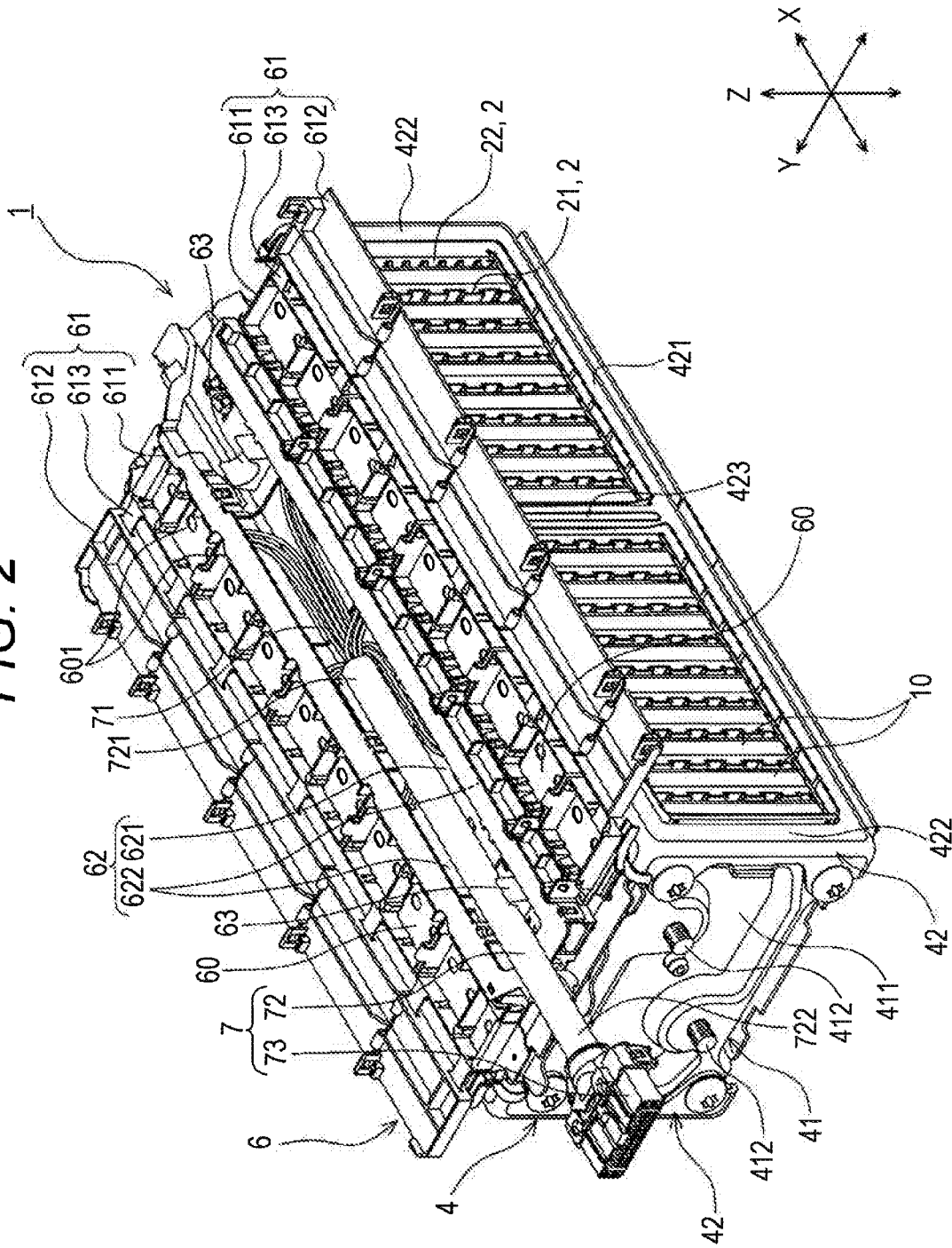
FIG. 2 is a perspective view of the energy storage apparatus showing a state where a lid portion of a cover member of the energy storage apparatus is opened.
Figure 3:
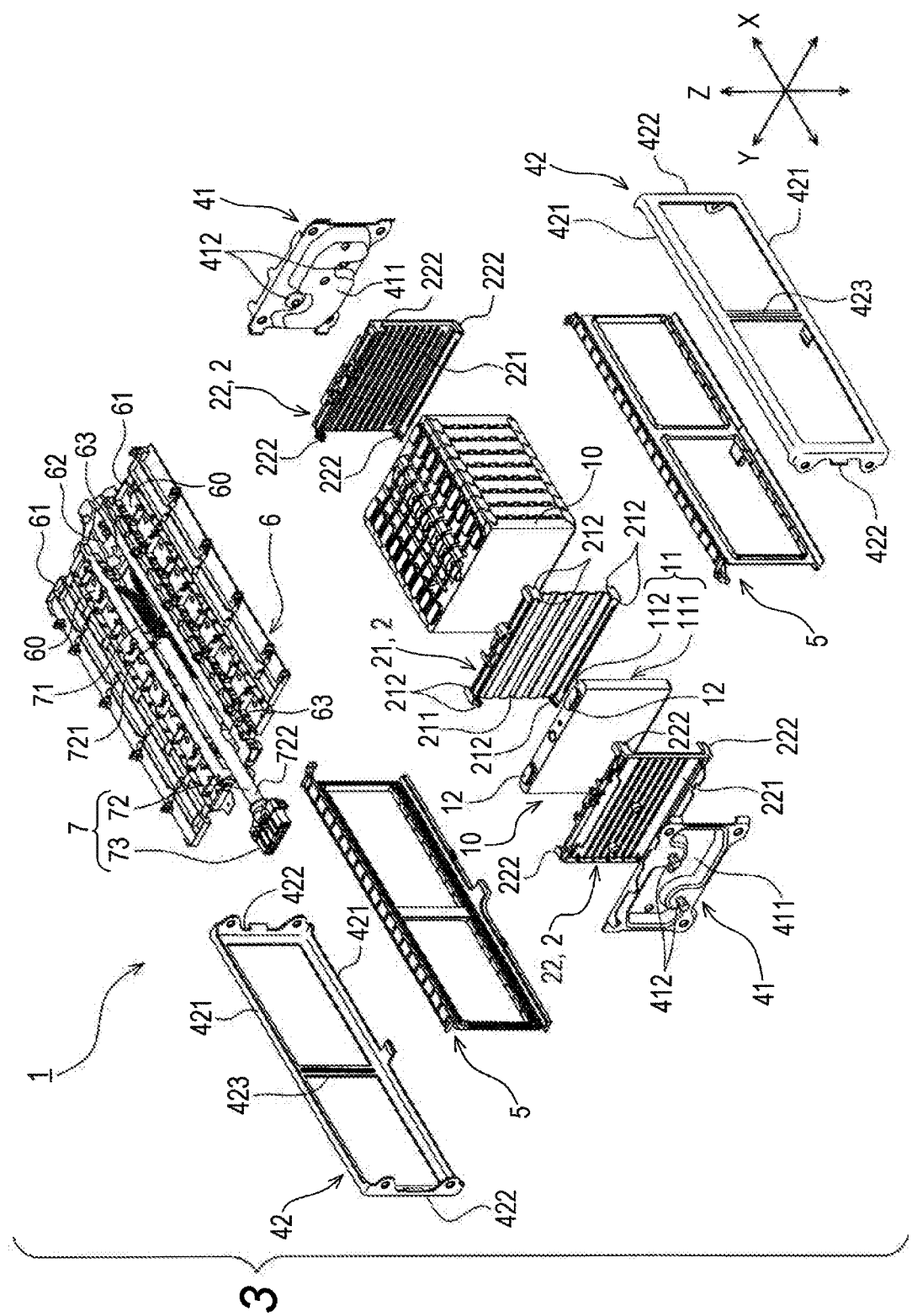
FIG. 3 is an exploded perspective view of the energy storage apparatus.

As shown in FIG. 1 to FIG. 3, the energy storage apparatus includes: a plurality of energy storage devices 10 arranged in a juxtaposed manner in a predetermined direction; a plurality of bus bars 60 each of which electrically connects the different energy storage devices 10 to each other; a bundle portion 7 which is formed by bundling a plurality of electric wires 71 which are connected to the energy storage devices 10 or the bus bars 60. In this embodiment, the plurality of bus bars 60 are respectively held by a cover member 6 which expands along the plurality of energy storage devices 10 arranged in a juxtaposed manner in the predetermined direction. That is, the energy storage apparatus 1 includes the cover member 6 which holds the plurality of bus bars 60. Further, the energy storage apparatus 1 includes neighboring members 2 which are disposed adjacently to the energy storage devices 10, a holding member 4 which holds the energy storage devices 10 and the neighboring members 2, and insulators 5 which are disposed between the energy storage devices 10 and the holding member 4.

Each of the plurality of energy storage devices 10 is a primary battery, a secondary battery, a capacitor or the like. The energy storage device 10 is a nonaqueous electrolyte secondary battery which can charge or discharge electricity. To be more specific, the energy storage device 10 is a lithium ion secondary battery which makes use of movement of electrons generated along with the movement of lithium ions.

The energy storage device 10 includes: an electrode assembly; a case 11 which houses the electrode assembly together with an electrolyte solution; external terminals 12 where at least a portion of each external terminal 12 is exposed to the outside of the case 11; and current collectors which connect the electrode assembly and the external terminals 12 to each other in the case 11.

In the electrode assembly, positive electrodes and negative electrodes are stacked such that the positive electrode and the negative electrode are alternately stacked with a separator interposed between the positive electrode and the negative electrode. In this electrode assembly, lithium ions move between the positive electrode and the negative electrode and hence, the energy storage device 10 can charge or discharge electricity.

The case 11 includes a case body 111 having an opening, and a plate-like lid plate 112 which covers (closes) the opening of the case body 111. In this embodiment, the case 11 has a flat rectangular parallelepiped shape. The plurality of energy storage devices 10 are arranged in a state where wide surfaces (wall portions) of the cases 11 (case bodies 111) opposedly face each other.

Hereinafter, a direction along which the plurality of energy storage devices 10 are arranged (predetermined direction: first direction) is assumed as an X axis in orthogonal coordinates, a direction along which a pair of narrow surfaces (wall portions) of the case body 111 oppposedly face each other is assumed as a Y axis in orthogonal coordinates, and a normal direction (second direction) of the lid plate 112 is assumed as a Z axis in orthogonal coordinates.

The neighboring member 2 is disposed between the energy storage devices 10 arranged in the X axis direction or between the energy storage device 10 and a member which is arranged in the X axis direction with respect to the energy storage device 10 (a part of the holding member 4 in an example of this embodiment). The neighboring members 2 are formed of plural kinds of neighboring members. In this embodiment, the neighboring member 2 is formed of: intermediate neighboring members 21 each of which is disposed adjacently to the energy storage devices 10 disposed at an intermediate position in the X axis direction; and terminal neighboring members 22 each of which is disposed adjacently to the energy storage device 10 disposed on an outermost ends in the X axis direction outside the outermost energy storage device 10. In the embodiment, the intermediate neighboring member 21 is disposed between each two respective energy storage devices 10. That is, the energy storage apparatus 1 includes the plurality of intermediate neighboring members 21. Further, the terminal neighboring members 22 are respectively disposed outside the energy storage devices 10 which are disposed on the outermost ends in the X axis direction respectively. That is, the energy storage apparatus 1 includes a pair of terminal neighboring members 22.

Each of the plurality of intermediate neighboring members 21 has an insulation property, and is arranged between two energy storage devices 10 which are disposed adjacently to each other in the X axis direction. Due to the provision of the intermediate neighboring member 21, a predetermined distance (a creepage distance or the like) is ensured between two energy storage devices 10 disposed adjacently to each other in the X axis direction.

To be more specific, the intermediate neighboring member 21 has a plate-like first body portion 211 positioned between two energy storage devices 10 disposed adjacently to each other in the X axis direction, and first restricting portions 212 which restrict movement of the energy storage devices 10 disposed adjacently to the first body portion 211 with respect to the first body portion 211.

The first body portion 211 is a portion which oppposedly faces the wide surfaces of the cases 11 of the energy storage devices 10, and expands in a Y-Z plane (a plane including the Y axis and the Z axis) direction. In this embodiment, the first body portion 211 forms flow passages for allowing a temperature regulating fluid (air in the example of this embodiment) to pass therethrough between the first body portion 211 and the energy storage device 10 disposed adjacently to the first body portion 211.

The first restricting portions 212 extend in the X axis direction from the first body portion 211, and are brought into contact with the energy storage devices 10 (specifically, the cases 11) disposed adjacently to the first body portion 211 from the outside in the Y-Z plane direction thus restricting the relative movement of the energy storage devices 10 in the Y-Z plane direction with respect to the first body portion 211. In this embodiment, the first restricting portions 212 extend toward both sides in the X axis direction from the first body portion 211 respectively.

Each of the pair of terminal neighboring members 22 has an insulation property, and is disposed between the energy storage device 10 which is disposed adjacently to the terminal neighboring member 22 in the X axis direction and the holding member 4 (terminal member 41). Due to the provision of the terminal neighboring member 22, a predetermined distance (a creepage distance or the like) can be ensured between the energy storage device 10 and the holding member 4 (terminal member 41).

To be more specific, the terminal neighboring member 22 has a second body portion 221 positioned between the energy storage device 10 and the holding member 4, and second restricting portions 222 which restrict movement of the energy storage device 10 disposed adjacently to the second body portion 221 with respect to the second body portion 221.

The second body portion 221 is a portion which oppposedly faces the wide surface of the case 11 of the energy storage device 10 disposed on an end portion of a unit formed of the plurality of energy storage devices 10 in the X axis direction, and is a plate-like portion expanding in the Y-Z plane direction. A fluid passage through which a fluid (air in the example of this embodiment) passes is formed between the second body portion 221 of this embodiment and the energy storage device 10 disposed adjacently to the second body portion 221.

The second restricting portions 222 extend in the X axis direction from the second body portion 221, and are brought into contact with the energy storage device 10 (specifically, the case 11) which is disposed adjacently to the second body portion 221 from the outside in the Y-Z plane direction thus restricting relative movement of the energy storage device 10 in the Y-Z plane direction with respect to the second body portion 221. In this embodiment, the second restricting portions 222 extend toward one side in the X axis direction (a side where the energy storage device 10 is disposed) from the second body portion 221.

The holding member 4 collectively holds the plurality of energy storage devices 10 and the plurality of neighboring members 2 by surrounding the periphery of the plurality of energy storage devices 10 and the plurality of neighboring members 2. The holding member 4 is formed of a member having conductivity such as metal. To be more specific, the holding member 4 includes: a pair of terminal members 41 disposed on both sides of the unit formed of the plurality of energy storage devices 10 in the X axis direction; and connecting members 42 which connect the pair of terminal members 41 to each other.

Each of the pair of terminal members 41 is disposed such that the terminal neighboring member 22 is positioned between the terminal member 41 and the energy storage device 10 arranged on the end of the unit in the X axis direction. Each terminal member 41 has a body 411 which expands along the terminal neighboring member 22, and bolt members 412 which are mounted on the body 411. In this embodiment, the terminal member 41 has a plurality of bolt members 412.

Each of the plurality of bolt members 412 is used for fixing the energy storage apparatus 1 to an object on which the energy storage apparatus 1 is mounted when the energy storage apparatus 1 is mounted or installed on the object. For example, in the case where the energy storage apparatus 1 of this embodiment is mounted on an automobile, the bolt members 412 are used for fixing the energy storage apparatus 1 to a mounting position of the automobile.

The pair of connecting members 42 is arranged on both sides of the unit formed of the plurality of energy storage devices 10 in the Y axis direction. Each of the pair of connecting members 42 has: a pair of beam portions 421 which extends in the X axis direction and is disposed in a spaced-apart manner in the Z axis direction; a pair of end portion connecting portions 422 which extends in the Z axis direction and connects end portions of the pair of beam portions 421 to each other; and intermediate connecting portions 423 each of which extends in the Z axis direction at an intermediate position in the X axis direction and connects the pair of beam portions 421 to each other. In this embodiment, the connecting member 42 includes the plurality of intermediate connecting portions 423.

The insulator 5 has an insulation property. The insulator 5 is arranged between the connecting member 42 and the unit formed of the plurality of energy storage devices 10. To be more specific, the insulator 5 covers at least a region of the connecting member 42 which opposedly faces the unit formed of the plurality of energy storage devices 10. With such a configuration, the connecting member 42 and the unit formed of the plurality of energy storage devices 10 are insulated from each other by the insulator 5.

The cover member 6 is a member which overlaps with the plurality of energy storage devices 10 arranged in the X axis direction in the Z axis direction (that is, covering the plurality of energy storage devices 10 from one side in the Z axis direction). In this embodiment, the cover member 6 is a resin-made integrally molded product. A profile of the cover member 6 is an approximately rectangular shape as viewed in the Z axis direction (a shape corresponding to the unit formed of the plurality of energy storage devices 10 in a state where the unit is held by the holding member 4).

Figure 4:
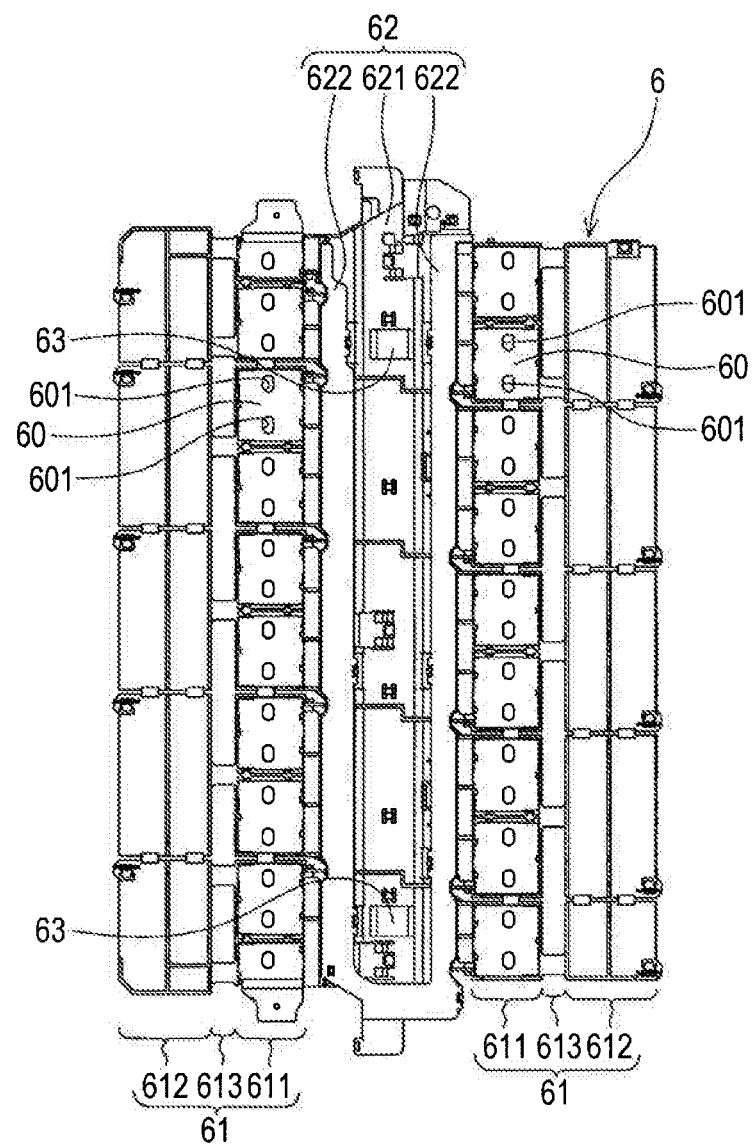
FIG. 4 is a view of the cover member as viewed in a Z axis direction in a state where the lid portion is opened.

To be more specific, as also shown in FIG. 4, the cover member 6 has: bus bar holding portions 61 for holding the bus bars 60; a wiring portion 62 where a plurality of electric wires 71 and the like are arranged; and bundle portion holding portions (holding portions) 63 capable of holding the bundle portions 7. In this embodiment, the bus bar holding portion 61 holds the plurality of bus bars 60. Each of the plurality of bus bars 60 is a plate-like member which is formed of a member having conductivity such as metal, and connects the corresponding external terminals 12 of the energy storage devices 10 disposed adjacently to each other in a conductive manner. In this embodiment, the plurality of bus bars 60 connect all of the plurality of energy storage devices 10 included in the energy storage apparatus 1 in series (thus making all of the plurality of energy storage devices 10 conductive with each other). To be more specific, each bus bar 60 is a thin-plate-like member having a rectangular profile. The bus bar 60 has holes 601 at positions which respectively overlap with the external terminals 12 of the energy storage devices 10 disposed adjacently to each other in the Z axis direction. That is, the bus bar 60 has two holes 601. In the energy storage apparatus 1 of this embodiment, hole peripheral portions of the bus bar 60 which define the holes 601 are connected to the external terminals 12 by welding.

The bus bar holding portion 61 holds the bus bars 60 in a state where the bus bar holding portion 61 surrounds the peripheries of the bus bars 60. To be more specific, the bus bar holding portion 61 has: rectangular cylindrical holding portion bodies 611; and lid portions 612 which close openings of the holding portion bodies 611. In this embodiment, the bus bar holding portion 61 has also connecting portions 613 which connect the holding portion bodies 611 and the lid portions 612 to each other. The bus bar holding portion 61 has: the holding portion bodies 611 the number of which is equal to the number of bus bars 60 (a plurality of holding portion bodies 611); and the lid portions 612 the number of which corresponds to the number of holding portion bodies 611 (the plurality of lid portions 612).

The plurality of holding portion bodies 611 are arranged in the X axis direction on both sides of the wiring portion 62 (both sides of the wiring portion 62 in the Y axis direction) disposed at the center of the cover member 6 in the Y axis direction. Each holding portion body 611 has a rectangular cylindrical shape, and one end and the other end of the holding portion body 611 are opened in the Z axis direction. The holding portion body 611 holds one bus bar 60 in a state where the holding portion body 611 surrounds the periphery of one bus bar 60. Each bus bar 60 is connected to the external terminals 12 of the energy storage devices 10 in a state where the bus bar 60 is surrounded by the holding portion body 611 (in the example of this embodiment, each bus bar 60 being connected to the external terminals 12 by welding).

The lid portions 612 are plate-like portions which close openings of the holding portion bodies 611 on one end side in the Z axis direction (on an upper end side in FIG. 2) in an openable manner. The lid portion 612 closes the opening of one holding portion body 611 on one end side in the Z axis direction, or closes the respective openings of two holding portion bodies 611 disposed adjacently to each other in the X axis direction on one end side in the Z axis direction. In this embodiment, the lid portion 612 has a rectangular shape as viewed in the Z axis direction. End portions of the respective lid portions 612 in the Y axis direction are connected to the holding portion bodies 611 by way of the thin-plate-like connecting portions 613, and the connecting portions 613 are folded back so that the openings of the holding portion bodies 611 on one end side in the Z axis direction are closed (see FIG. 1).

The wiring portion 62 is a portion where the plurality of electric wires 71 connected to the energy storage devices 10 or the bus bars 60, the bundle portion 7 which is formed by bundling the plurality of electric wires 71 and the like are disposed. In this embodiment, the wiring portion 62 is a groove-shaped portion extending in the X axis direction at the center portion of the cover member 6 in the Y axis direction. The wiring portion 62 has: a plate-like first portion 621 which expands in an X-Y plane direction; and a pair of second portions 622 which is raised (extends in the Z axis direction) with respect to the first portion 621 from edges of the first portion 621 in the Y axis direction.

The plurality of electric wires 71 disposed in the groove-shaped wiring portion 62 include: electric wires connected to the bus bars 60 (or extending from the bus bars 60) for measuring voltages of the bus bars 60 (between the energy storage devices 10 connected to each other by the bus bars 60); electric wires connected to temperature sensors (or extending from temperature sensors) such as thermistors mounted on the energy storage devices 10 (to be more specific, the cases 11 of the energy storage devices 10) for measuring temperatures of the energy storage devices 10 and the like. The bundle portion 7 is formed by bundling these respective electric wires 71.

The bundle portion holding portion 63 detachably holds the bundle portion 7 in a state where the bundle portion 7 extends in the X axis direction along the plurality of energy storage devices 10, that is, in a state where the bundle portion 7 extends in the X axis direction along the wiring portion 62 (to be more specific, the first portion 621).

To be more specific, the bundle portion holding portion 63 has two protruding portions 631 which extend in the Z axis direction from the first portion 621 at end portions of the wiring portion 62 in the X axis direction. These two protruding portions 631 are formed into a shape where a distance between tip end portions of the protruding portions 631 is narrower than a width of the bundle portion 7 (to be more specific, a bundle portion body 72 described later), and distances between the protruding portions 631 at respective positions in the Z axis direction from the tip end portions to a proximal end side conform to a cross-sectional shape of the bundle portion 7 (bundle portion body 72) (see FIG. 5). Further, two protruding portions 631 are configured to be resiliently deformed such that when the bundle portion 7 is pushed between two protruding portions 631 or when the bundle portion 7 disposed between two protruding portions 631 is pulled toward the outside in the Z axis direction, the distance between the tip end portions of the protruding portions 631 is increased so as to allow the bundle portion 7 to pass through between the tip end portions of the protruding portions 631. With such a configuration, the bundle portion holding portion 63 holds the bundle portion 7 such that the bundle portion 7 (bundle portion body 72) is pushed toward the energy storage devices 10 in the Z axis direction and are fitted in the bundle portion holding portion 63 (between two protruding portions 631). The bundle portion 7 is released from the bundle portion holding portion 63 when the bundle portion 7 is pulled toward a side opposite to the energy storage devices 10 in the Z axis direction from a state where the bundle portion 7 (bundle portion body 72) is held by the bundle portion holding portion 63. That is, the bundle portion 7 is removed from between two protruding portions 631.

In this embodiment, the cover member 6 has the bundle portion holding portion 63 on both end portions of the wiring portion 62 in the X axis direction respectively. That is, the cover member 6 has two bundle portion holding portions 63.

The bundle portion 7 is a so-called wire harness, and has: the bundle portion body 72 formed by bundling the plurality of electric wires 71; and a connector 73 which is connected to a tip end of the bundle portion body 72.

In the bundle portion body 72 of this embodiment, the plurality of electric wires 71 are bundled by winding a periphery of a bundle formed of the plurality of electric wires 71 by a tape, a resin-made tube, a binding band or the like. A base portion 721 of the bundle portion body 72 is disposed at the position along the energy storage devices 10 which is the intermediate position in the X axis direction of the plurality of energy storage devices 10 (a group of energy storage devices). In this embodiment, the base portion 721 of the bundle portion body 72 is disposed at the center position of the plurality of energy storage devices 10 in the X axis direction. To be more specific, the respective electric wires 71 which extend from the bus bars 60, the temperature sensors mounted on the cases 11 and the like are collected at the above-mentioned center position in the X axis direction along the first portion 621 of the wiring portion 62, and the electric wires 71 are bundled by a tape, a tube, a binding band or the like from the position where the electric wires 71 are collected thus forming the bundle portion body 72.

The bundle portion body 72 can change a direction of the bundle portion body 72 using the base portion 721 as an initiation point (fulcrum). For example, the bundle portion body 72 can change the direction thereof using the base portion 721 as the initiation point so as to take various postures such as a posture where a tip end portion 722 (the other end of the bundle portion) of the bundle portion body 72 is directed toward one side in the X axis direction (see symbol 7A in FIG. 1 and FIG. 6), a posture where the tip end portion 722 is directed toward the other side in the X axis direction (see symbol 7B in FIG. 6), and a posture where the tip end portion 722 is directed in the Z axis direction (the direction away from the energy storage devices 10) (see symbol 7C in FIG. 6). In this embodiment, the bundle portion body 72 can change the direction thereof in an arbitrary direction using the base portion 721 as the initiation point within a range where the bundle portion body 72 does not interfere with the respective portions of the cover member 6 (the second portion 622 of the wiring portion 62 and the like).

The bundle portion body 72 is configured such that the tip end portion 722 extends to a position outside in the X axis direction from the terminal member 41 in both of a state where the bundle portion body 72 extends toward one side in the X axis direction (see symbol 7A in FIG. 6) and a state where the bundle portion body 72 extends toward the other side in the X axis direction (see symbol 7B in FIG. 6). That is, a length of the bundle portion body 72 is set larger than a half (½) of a length of the energy storage apparatus 1 in the X axis direction excluding the bundle portion 7. The respective electric wires 71 have a length which allows the electric wires 71 to slightly slacken both in a state where the bundle portion body 72 extends toward one side in the X axis direction (see symbol 7A in FIG. 6) and in a state where the bundle portion body 72 extends toward the other side in the X axis direction (see symbol 7B in FIG. 6) respectively. With such a configuration, when the direction of the bundle portion 7 is changed using the base portion 721 as an initiation point, it is possible to prevent the occurrence of disconnection of electric wires 71 or the like attributed to pulling of some electric wires 71.

The bundle portion body 72 has flexibility. Accordingly, the bundle portion body 72 can be bent at an intermediate position (at one position or a plurality of positions) of the bundle portion body 72 in a longitudinal direction of the bundle portion body 72, or the entire bundle portion body 72 can be curved and the like (see FIG. 7).

Figure 5:
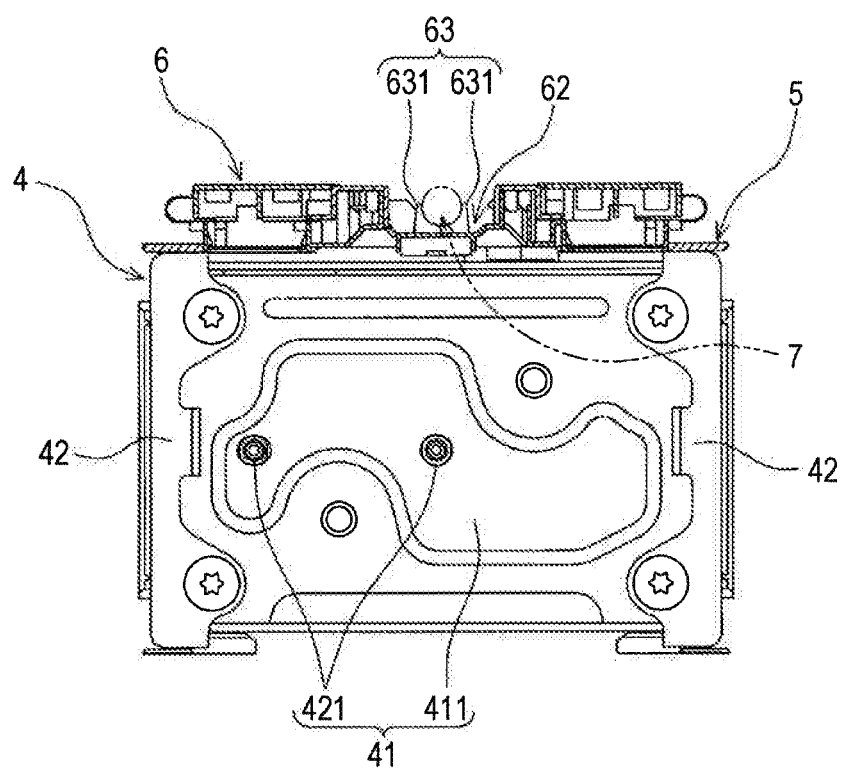
FIG. 5 is a cross-sectional schematic view taken along line V-V in FIG. 1.
Figure 5:
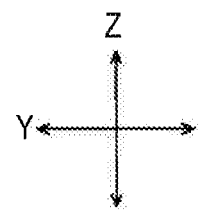

A size (a diameter) of a cross-sectional shape of the bundle portion body 72 is smaller than a depth of the wiring portion 62 (a size of the second portion 622 in the Z axis direction) (see FIG. 5). With such a configuration, when the bundle portion body 72 is brought into a state where the bundle portion body 72 extends toward one side or the other side in the X axis direction (see symbol 7A or symbol 7B in FIG. 6), the bundle portion body 72 is housed in the wiring portion 62 (that is, the protrusion of the bundle portion body 72 from the bus bar holding portion 61 toward the outside in the Z axis direction being prevented).

The connector 73 is flattened in a direction orthogonal to a direction that the connector 73 engages with a counterpart connector by fitting engagement. The connector 73 is connected to the tip end portion 722 of the bundle portion body 72 such that the bundle portion body 72 is brought into a state where, when the bundle portion body 72 extends along a direction (Z axis direction) away from the plurality of energy storage devices 10 (see symbol 7C in FIG. 6), such a longitudinal direction of the connector 73 is disposed along the Z axis direction. That is, the connector 73 is configured such that, when the bundle portion body 72 extends along the Z axis direction, one surface 731 of the connector 73 in a lateral direction is directed toward one side in the Y axis direction, and the other surface 732 in the lateral direction is directed toward the other side in the Y axis direction.

According to the energy storage apparatus 1 having the above-mentioned configuration, the bundle portion body 72 which is formed by bundling the plurality of electric wires 71 (bundle portion 7) can change the direction of the bundle portion body 72 using the base portion 721 of the bundle portion body 72 as an initiation point and hence, the lead-out direction of the bundle portion 7 from the energy storage apparatus 1 can be easily changed.

In the energy storage apparatus 1 of this embodiment, the base portion 721 of the bundle portion body 72 is disposed at the center position of the energy storage apparatus 1 in the X axis direction. With such a configuration, whichever direction the lead-out direction of the bundle portion 7 is changed between the direction toward one side and the direction toward the other side in the X axis direction, a distance from an end portion (terminal member 41) of the energy storage apparatus 1 in the X axis direction excluding the bundle portion 7 to the tip portion of the bundle portion 7 becomes equal (see symbols 7A, 7B in FIG. 6). That is, whichever direction the lead-out direction of the bundle portion 7 is changed between the direction toward one side and the direction toward the other side in the X axis direction, a length of a portion of the bundle portion 7 protruding outward from the terminal member 41 in the X axis direction becomes equal.

The energy storage apparatus 1 according to this embodiment includes the bundle portion holding portions (holding portions) 63 which can detachably hold the bundle portion 7 (bundle portion body 72) in a state where the bundle portion 7 extends in the X axis direction.

Accordingly, it is possible to fix the bundle portion 7 in a state where the bundle portion 7 is led out toward one side or the other side in the X axis direction. Further, the bundle portion holding portion 63 detachably holds the bundle portion body 72 (bundle portion 7) and hence, even after the bundle portion body 72 is held by the bundle portion holding portion 63, by removing the bundle portion body 72 from the bundle portion holding portion 63, the direction of the bundle portion body 72 can be easily changed.

In the case where it is already determined which one of surfaces out of the surfaces 731, 732 of the flat connector 73 in a lateral direction is directed toward one side in the Z axis direction in the use of the connector 73, in the energy storage apparatus 1 of this embodiment, when the bundle portion 7 is in a state where the bundle portion 7 extends in the Z axis direction, the longitudinal direction of the flat connector 73 is disposed along the X axis direction. Accordingly, whichever direction the bundle portion 7 is led out between the direction toward one side or the direction toward the other side in the X axis direction, by rotating the connector 73 about the center line of the bundle portion 7 by a half rotation, the direction of the connector 73 (the front-and-back direction) can be made equal (see symbol 7A and symbol 7B in FIG. 6). That is, in the energy storage apparatus 1 where one side surface of the connector in the lateral direction is directed toward one side in the Z axis direction when the bundle portion is led out toward one side in the X axis direction, to make the front-and-back direction of the connector when the bundle portion is led out toward the other side in the X axis direction equal to the front-and-back direction of the connector when the bundle portion is led out toward one side in the X axis direction, it is necessary to twist the connector about the center line of the bundle portion by a half rotation (180°). Accordingly, when the bundle portion is used in a state where the bundle portion is lead out toward the other side in the first direction, the electric wires is liable to be damaged due to the twisting. However, according to the energy storage apparatus 1 of this embodiment, whichever direction the bundle portion 7 is led out between the direction toward one side in the X direction and the direction toward the other side in the X axis direction, by merely twisting the connector 73 by a quarter rotation (90°), the direction (front-and-back direction) of the connector 73 can be set equal and hence, a damage on the electric wires due to the twisting can be suppressed.

It is needless to say that the energy storage apparatus of the present invention is not limited to the above-mentioned embodiment, and various modifications are conceivable without departing from the gist of the present invention. For example, the configuration of another embodiment may be added to the configuration of one embodiment. Alternatively, a part of the configuration of one embodiment may be replaced with the configuration of another embodiment. Further, a part of the configuration of one embodiment may be omitted.

In the energy storage apparatus 1 of the above-mentioned embodiment, the connector 73 is flattened in a direction orthogonal to the direction that the connector 73 engages with the counterpart connector in fitting engagement. However, the connector 73 may not be flattened.

In the bundle portion 7 of the above-mentioned embodiment, the connector 73 is connected to the tip end portion 722 of the bundle portion body 72. However, the present invention is not limited to such a configuration. The bundle portion 7 may not include the connector 73.

Although the bundle portion 7 of the above-mentioned embodiment includes: the electric wires extending from the bus bars 60; and the electric wires extending from the temperature sensors. However, the present invention is not limited to such a configuration. The bundle portion 7 may be formed of either one of the electric wires extending from the bus bars 60 or the electric wires extending from the temperature sensors. Further, the bundle portion 7 may include other electric wires (electric wires other than the electric wires extending from the bus bars 60 and the electric wires extending from the temperature sensors).

In the energy storage apparatus 1 of the above-mentioned embodiment, the base portion 721 of the bundle portion body 72 is disposed at the center position of the energy storage apparatus 1 in the X axis direction. However, the present invention is not limited to such a configuration. The base portion 721 of the bundle portion body 72 may be disposed at the position offset toward one side or the other side from the center position of the energy storage apparatus 1 in the X axis direction.

In the energy storage apparatus 1 of this embodiment, the plurality of electric wires 71 are respectively independent electric wire or the like. However, the present invention is not limited to such a configuration. The plurality of electric wires 71 may be integrally formed with a printed circuit board until the plurality of electric wires 71 reach the intermediate position in a current flow direction (for example, to the position of the base portion 721 of the bundle portion body 72).

What is claimed is:
1. An energy storage apparatus, comprising:
a plurality of energy storage devices arranged in a first direction;
a plurality of bus bars electrically connecting the energy storage devices; and
a bundle portion configured by bundling a plurality of electric wires each of which includes an electric wire connected to the energy storage device or the bus bar,
wherein the energy storage apparatus includes a first end portion in the first direction and a second end portion opposite to the first end portion in the first direction,
wherein the bundle portion includes a base portion and a tip portion,
wherein the base portion is positioned between the first and second end portions, wherein the tip portion is capable of protruding from the first end portion in the first direction and is capable of protruding from the second end portion in the first direction,
wherein the tip portion is located at a distal edge of the bundle portion and the base portion is located at a proximal edge of the bundle portion such that the plurality of electric wires protrude from the bundle portion to outside of the bundle portion at the proximal edge of the bundle portion,
wherein the plurality of electric wires includes:
a first group of electric wires extending in the first direction from the energy storage device or the bus bar toward the proximal edge of the bundle portion; and
a second group of electric wires extending opposite to the first direction from the energy storage device or the bus bar toward the proximal edge of the bundle portion, and
wherein the bundle portion pivots at a middle of the energy storage apparatus, with respect to a stacking direction of the energy storage devices, along the first direction into a second direction orthogonal to the first direction.

2. The energy storage apparatus according to claim 1, wherein the base portion of the bundle portion is arranged at an intermediate position in the first direction.

3. The energy storage apparatus according to claim 1, further comprising a holding portion which detachably holds the bundle portion extending along the energy storage device in the first direction.

4. The energy storage apparatus according to claim 1, wherein the bundle portion includes a connector at the tip portion, and
wherein the base portion of the bundle portion is configured such that one surface of the connector, which faces toward the second direction away from the energy storage apparatus when the tip portion protrudes from the first end portion, faces toward the second direction when the tip portion protrudes from the second end portion.

5. The energy storage apparatus according to claim 1, wherein the electric wire is connected to the energy storage device.

6. The energy storage apparatus according to claim 1, wherein the electric wire is connected to the bus bar.

7. The energy storage apparatus according to claim 1, wherein the first group of electric wires and the second group of electric wires bundle together at the proximal edge of the bundle portion to enter the base portion of the bundle portion.

8. The energy storage apparatus according to claim 7, wherein, after entering to the bundle portion, each of the first group of electric wires and the second group of electric wires extends in the first direction toward the distal edge of the bundle portion.

9. The energy storage apparatus according to claim 1, wherein the bundle portion is configured to stand upright in the second direction orthogonal to the first direction, such that the distal edge of the bundle portion and the proximal edge of the bundle portion are disposed on opposing sides of the bundle portion.

10. The energy storage apparatus according to claim 1, wherein, in the second direction orthogonal to the first direction, the bundle portion continuously extends from the distal edge of the bundle portion to the proximal edge of the bundle portion.

11. The energy storage apparatus according to claim 1, wherein the electric wires of the plurality of electric wires extend from the energy storage device or the bus bar in opposite directions to each other to enter the base portion of the bundle portion.

12. An energy storage apparatus, comprising:
a plurality of energy storage devices arranged in a first direction;
a plurality of bus bars electrically connecting the energy storage devices; and
a bundle portion configured by bundling a plurality of electric wires each of which includes an electric wire connected to the energy storage device or the bus bar,
wherein the energy storage apparatus includes a first end portion in the first direction and a second end portion opposite to the first end portion in the first direction,
wherein the bundle portion includes a base portion and a tip portion,
wherein the base portion is positioned between the first and second end portions,
wherein the tip portion is capable of protruding from the first end portion in the first direction and is capable of protruding from the second end portion in the first direction,
wherein the bundle portion is capable of standing upright on the base portion in a second direction away from the energy storage apparatus, and
wherein the bundle portion pivots at a middle of the energy storage apparatus, with respect to a stacking direction of the energy storage devices, along the first direction into the second direction orthogonal to the first direction.

13. The energy storage apparatus according to claim 12, wherein the tip portion is located at a distal edge of the bundle portion and the base portion is located at a proximal edge of the bundle portion such that the plurality of electric wires protrude from the bundle portion to outside of the bundle portion at the proximal edge of the bundle portion.

14. The energy storage apparatus according to claim 13, wherein the plurality of electric wires includes:
a first group of electric wires extending in the first direction from the energy storage device or the bus bar toward the proximal edge of the bundle portion; and
a second group of electric wires extending opposite to the first direction from the energy storage device or the bus bar toward the proximal edge of the bundle portion.

15. The energy storage apparatus according to claim 14, wherein the first group of electric wires and the second group of electric wires bundle together at the proximal edge of the bundle portion to enter the base portion of the bundle portion.

16. The energy storage apparatus according to claim 15, wherein, after entering to the bundle portion, each of the first group of electric wires and the second group of electric wires extends in the first direction toward the distal edge of the bundle portion.

17. The energy storage apparatus according to claim 13, wherein the bundle portion is configured to stand upright such that, in the second direction orthogonal to the first direction, the distal edge of the bundle portion and the proximal edge of the bundle portion are disposed on opposing sides of the bundle portion, such that, in the second direction, the bundle portion continuously extends from the distal edge of the bundle portion to the proximal edge of the bundle portion.

18. The energy storage apparatus according to claim 12, wherein the electric wires of the plurality of electric wires extend from the energy storage device or the bus bar in opposite directions to each other to enter the base portion of the bundle portion.

\* \* \* \* \*